(12) United States Patent
Harris et al.

(10) Patent No.: US 10,119,630 B2
(45) Date of Patent: Nov. 6, 2018

(54) FLOWLINE RESTRAINT METHOD

(71) Applicants: Daniel William Harris, Okotoks (CA); Leslie Gregg Hampton, Okotoks (CA)

(72) Inventors: Daniel William Harris, Okotoks (CA); Leslie Gregg Hampton, Okotoks (CA)

(73) Assignee: RIG-IT RESTRAINTS INC., Calgary, Alberta (CA)

( * ) Notice: Subject to any disclaimer, the term of this patent is extended or adjusted under 35 U.S.C. 154(b) by 0 days.

(21) Appl. No.: 15/427,060

(22) Filed: Feb. 8, 2017

(65) Prior Publication Data
US 2018/0224025 A1    Aug. 9, 2018

(51) Int. Cl.
F16L 3/00    (2006.01)
F16L 3/02    (2006.01)

(52) U.S. Cl.
CPC .................................... F16L 3/02 (2013.01)

(58) Field of Classification Search
CPC ... F16L 55/005; F16L 3/26; F16L 3/02; F16L 13/04; Y10T 24/3909
USPC .................................... 138/110, 106; 248/49
See application file for complete search history.

(56) References Cited

U.S. PATENT DOCUMENTS

| | | | | |
|---|---|---|---|---|
| 3,813,733 A * | 6/1974 | Flohr | ............... | F16L 55/005 24/279 |
| 3,859,692 A * | 1/1975 | Waterman | ......... | F16L 55/005 24/300 |
| 4,890,363 A * | 1/1990 | Cross | ................ | F16L 55/005 24/129 R |
| 5,873,608 A * | 2/1999 | Tharp | ............... | F16L 55/005 285/114 |
| 6,481,457 B2 * | 11/2002 | Hayes | ............... | F16L 55/005 137/377 |
| 8,132,595 B2 * | 3/2012 | Gayaut | ............. | F16L 3/18 138/106 |
| 8,905,081 B2 * | 12/2014 | Lee | .................. | F16L 55/005 138/106 |
| 8,991,031 B2 * | 3/2015 | Meadows | ......... | F16L 35/00 285/117 |
| 9,890,890 B2 | 2/2018 | Bond, Jr. et al. | | |
| 9,920,870 B2 | 3/2018 | Bond, Jr. et al. | | |
| 2013/0319565 A1 * | 12/2013 | St. Germain, Jr. | ... | F16L 3/04 138/106 |
| 2014/0217761 A1 * | 8/2014 | Bond, Jr. | .......... | F16L 55/005 294/74 |
| 2015/0369415 A1 * | 12/2015 | Bond, Jr. | .......... | F16L 55/005 248/49 |

* cited by examiner

Primary Examiner — Patrick F Brinson
(74) Attorney, Agent, or Firm — Field LLP

(57) ABSTRACT

A method for securing flowline segments in a flowline is disclosed. A high tensile strength restraining line is extended along the length of the flowline. At each joint between segments, the restraining line is knotted around the flowline on either one or both sides of the flowline joint. The knots secure each flowline segment such that in the case of a fail of a flowline joint, the disconnected flowline segments are maintained in place.

14 Claims, 7 Drawing Sheets

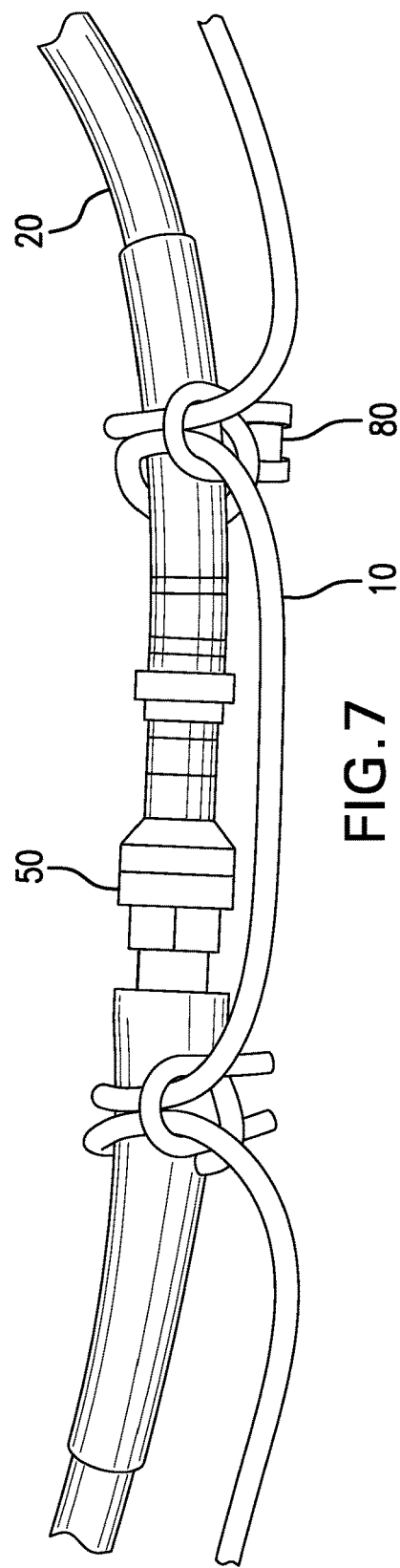

FLOWLINE RESTRAINT METHOD

This invention is in the field of flowline restraining systems and methods of installation.

BACKGROUND

Flowlines are commonly used in several industrial applications. One example are lines used in the oil and gas industry to connect a petroleum wellhead to pump truck or other such equipment. In some circumstances these flowlines are temporary in nature and as such readily assembled by connecting several segments together, the result being a joint between each segment. This permits assembly of the temporary flowline to a custom length and layout configuration, depending on the location and operational requirements.

These flowlines are frequently used in operations where the internal pressure in the flowline can be several thousand pounds per square inch. Under these conditions, if a joint between flowline segments were to fail, the results can be catastrophic. Under conditions of high pressure, the energy release resulting from flowline segment separation can cause flowline segments to become projectiles that are ejected at high velocity. This is a particularly unsafe, and sometimes lethal, situation. Prior art methods have been developed to secure flowline segments to reduce the chances of injury or death to nearby workers in the case of a fail in a flowline joint. In some cases, these can be clamps that are secured to either side of a joint and which have a structure to join each clamp. The primary drawback in this type of arrangement is the expense and complexity of the clamping system, as well as the time need to install a clamp at each joint along a run of flowline segments. Thus, what is needed a flowline restraint system that is simple, less costly, and easy to install.

SUMMARY OF THE INVENTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, the term flowline is understood to refer to any temporary, semi-permanent, or permanent fixture assembled to conduct fluids under pressure from a source location to an output location. Flowlines may alternatively be referred to in the art as pipelines. Flowlines can be constructed from rigid members or flexible hose. Those of skill in the art will readily appreciate the various designs and configurations of flowlines and pipelines that will be compatible with the invention of the present disclosure. The precise nature or means of assembly or construction of the flowline is not intended to be limiting to the scope of the invention as defined by the claims.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The present invention comprises a restraint system for flowlines. In a preferred embodiment, a high tensile strength polymeric restraining line is used to secure adjacent segments within the flowline. Conveniently, this can be accomplished by forming a half hitch knot with the restraining line, around each segment of the flowline. The restraining line is further secured at each end to an anchor. When installed, the restraining system prevents uncontrolled ejection of a flowline segment should a fail of the flowline occur, either along a segment or at a joint between adjacent segments.

Thus, in some embodiments there is disclosed a method of restraining a flowline having two ends and comprising a plurality of flowline segments connected in an end to end manner with a flowline joint between each adjacent pair of flowline segments, wherein the method comprises; coupling a restraining line to a first anchor located in proximity to an end of the flowline said restraining line being a non-sling restraining line; extending the restraining line from the first anchor along a restrained portion of the flowline and knotting the restraining line around the circumference of each flowline segment on each side of each flowline joint within said restrained portion; and securing the restraining line to a second anchor at the distal end of the restrained portion from the first anchor; whereby upon a failure of a flowline joint within the restrained portion of the flowline, the restraining line knotted around the circumference of the flowline segments on either side of the failed joint will hold said flowline segments in position in relation to the remainder of the flowline. In some embodiments of the method, the restraining line is knotted around each flowline segment in a half hitch knot.

In some embodiments, the first anchor is located at a source end of the flowline. In some embodiments, the first anchor is located at an output end of the flowline.

In some embodiments, a single restraining line is used to secure the entirety of the restrained portion of the flowline, while in still others a plurality of restraining lines are used to secure the entire length of the restrained portion of the flowline. In some cases, each of the plurality of restraining lines are secured to at least one other restraining line by at least one of a saddle knot and a shackle.

In one aspect of the invention is to ensure that the restrained portion of the flowline is the entire flowline from origin to destination. In another aspect of the invention the restrained portion of the flowline is less than the entire flowline.

In some embodiments, the restraining line is a high tensile strength rope.

There is also provided a restraint system for use in restraining a flowline having two ends and comprising a plurality of flowline segments connected in an end to end manner with a flowline joint between each adjacent pair of flowline segments, said system comprising: a restraining line for attachment between a first anchor and a second anchor, said first anchor being located in proximity to a first end of the portion of the flowline to be restrained, and said second anchor located in proximity to a second end of the portion of the flowline to be restrained, said restraining line being a non-sling restraining line, wherein: the restraining line is of sufficient length to be extended along the restrained portion of the flowline and knotted around the circumference of each flowline segment on each side of each flowline joint within said restrained portion; and the restraining line is of sufficient tensile strength to maintain the flowline segments on either side of a failed flowline joint in position upon failure of said joint. In some embodiments, the restraining line comprises a rope.

In some embodiments, a single restraining line is used to secure the entirety of the restrained portion of the flowline, while in other embodiments a plurality of restraining lines are used to secure the entire length of the restrained portion of the flowline.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numerals, and where:

FIG. 7 depicts an embodiment of flowline restraint system in which a combination of shackles and a knot around the circumference are placed on either side of a joint in a flowline.

DETAILED DESCRIPTION OF THE INVENTION

The present invention comprises a method of restraining segments used to fashion a flowline. The method described herein provides a lightweight restraint, that is simple to install, in order to contain a catastrophic break in a flowline operating under pressure.

In one embodiment, the restraint comprises a restraining line 10, or line, comprising ultra-high molecular weight polyethylene fiber (HMPE) rope. Those of skill in the art will recognize that any flexible high tensile strength restraining line or line will be compatible with the method of providing a flowline restraint system as disclosed herein. HMPE provides several advantages over other materials in that it has a high strength to weight ratio, low elongation at the break and resistance to a wide range of chemical agents.

In general, a flowline 20 can be assembled to provide a conduit for materials from a source location, such as a wellhead 30, to a receiving location, such as a pump truck 40 or tank. In general, the flowline will be assembled by connecting several segments in an end to end manner until a complete flowline is fashioned that links the source end of the flowline to the output end. Once the flowline is assembled, and before being placed into service, a restraint is then added as will be described.

Figure 1:
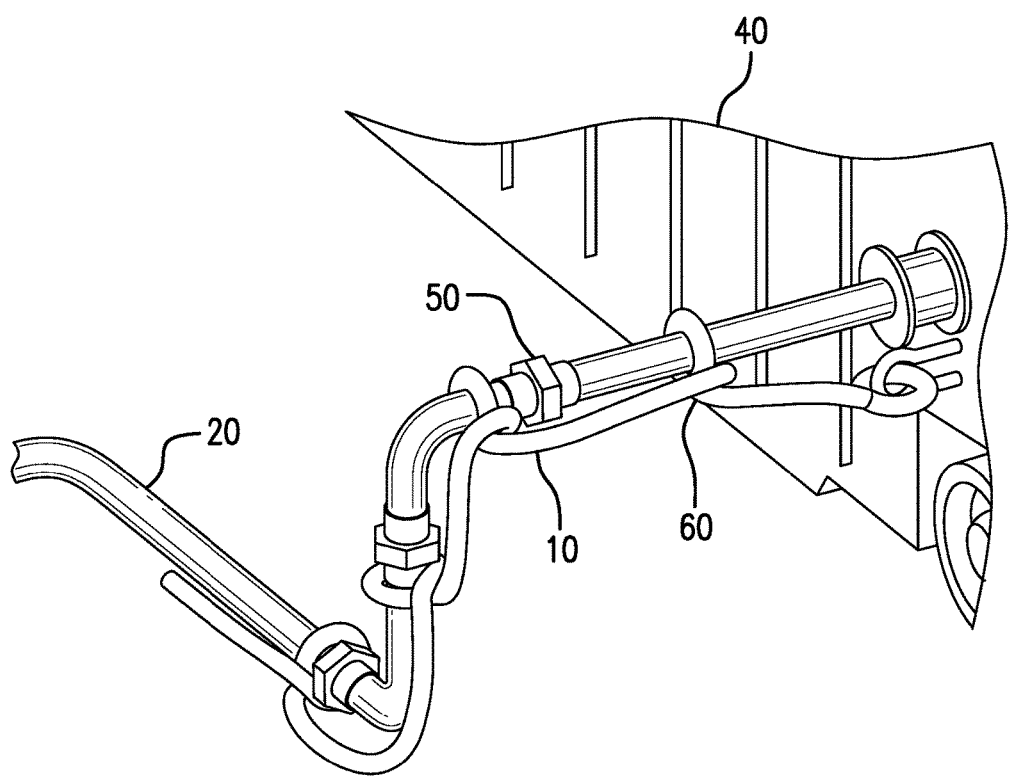
FIG. 1 depicts an embodiment of a flowline restraint system showing attachment of one end of the restraint to a pump truck.
Figure 2:
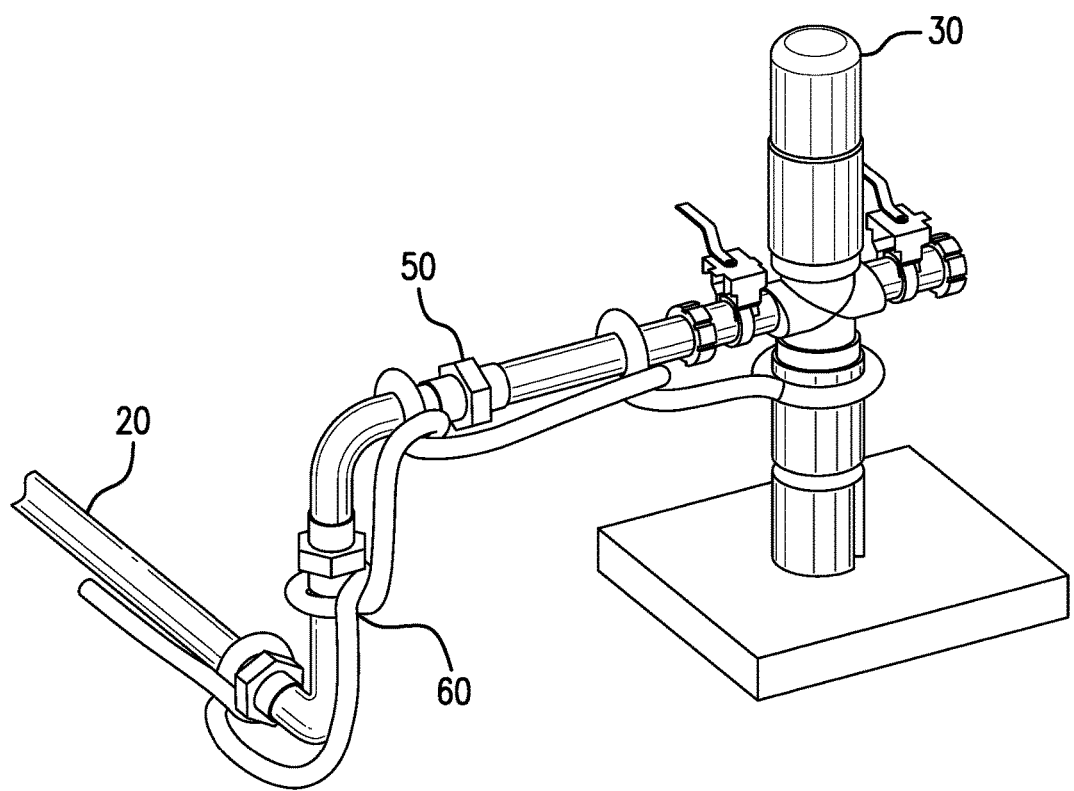
FIG. 2 depicts an embodiment of a flowline restraint system showing attachment of one end of the restraint to a wellhead.

Conveniently rigging the restraint system can begin at either the source end or output end of the flowline. As shown in FIG. 1, the restraint restraining line can be fashioned with a closed loop that attaches to a fixed point on a structural element of a structure located at or near the output end of the flowline, for example to the superstructure of a pump truck 40. Those of skill in the art will also recognize that there will be other methods for securing a line to an anchoring structure such as various forms of knots. It will also be recognized that a user may prefer to begin assembling the restraint system beginning at the source end of the flowline, for example at a wellhead 30, as depicted in the embodiment presented in FIG. 2. In either case, the end attachment provides a source of resistance against which the restraint is secured and which provides for resistance to maintain the restraint at a desired tension once in place. Preferably, the connection will be made to a structural element with sufficient strength to support the load exerted on the restraint restraining line should a flowline joint 50 fail occur.

Figure 3:
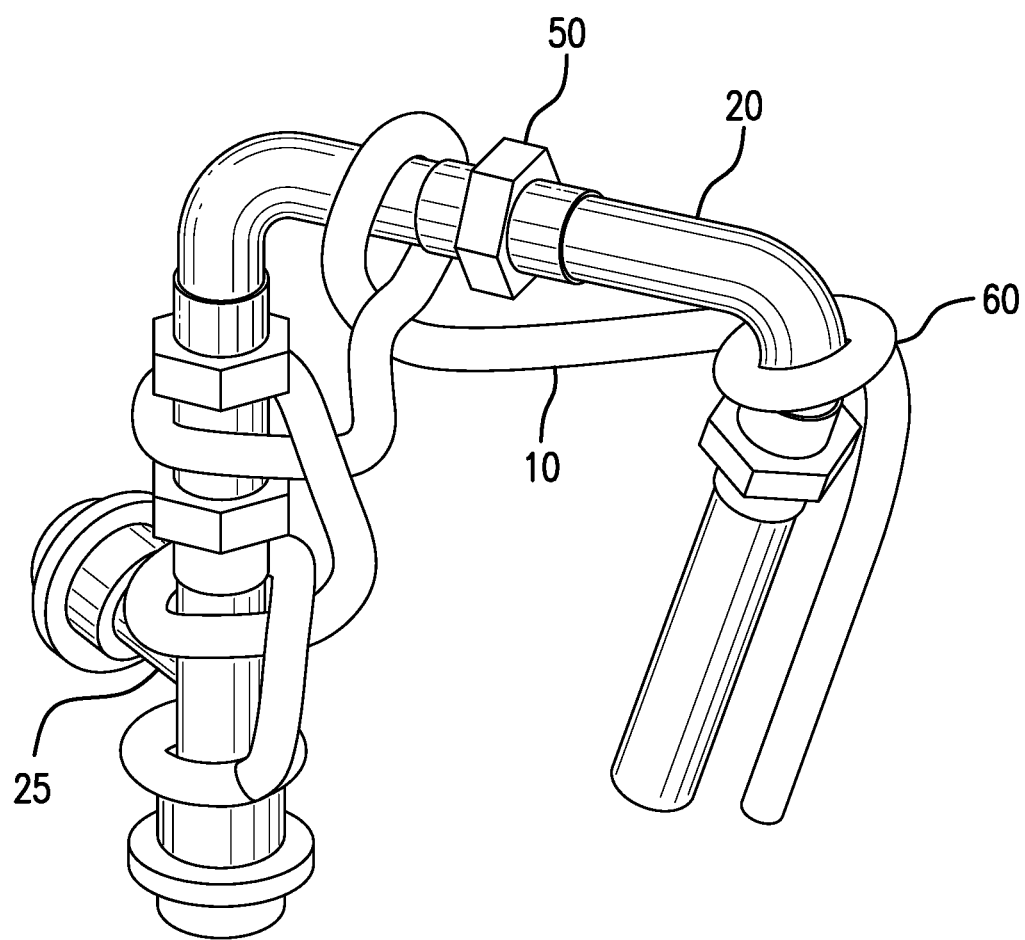
FIG. 3 depicts an embodiment of a flowline restraint system showing an exemplary installation configuration at flowline junction.
Figure 4:
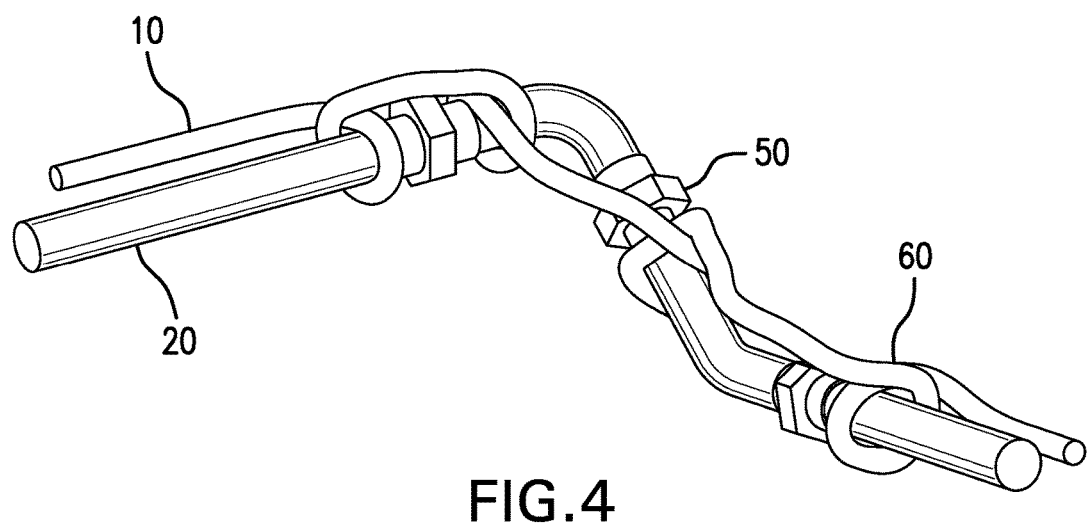
FIG. 4 depicts an embodiment of a flowline restraint system showing a configuration where a knot is formed near each segment in the flowline.

As shown in FIG. 1-4, the restraining line is played out along the length of the flowline. In some embodiments, the restraining line is wrapped around each flowline segment to form a half hitch knot 60. In the embodiments depicted in the Figures, one half hitch knot is formed per flowline segment. For additional security, a user may choose to wrap the restraining line around the flowline in a half hitch knot on either side of each flowline joint 50. FIG. 3 provides an example of the use of the method to security flowlines at a junction, where multiple flowlines may emanate from a source location or where a junction 25 is formed at any location where multiple flow lines converge to a common point.

By forming half hitch knows at each flowline segment, each flowline segment is secured by the restraint such that in the event of the fail of a flowline joint, the segment or segments that have become disconnected by the fail are constrained by the restraint and are prevented from being freely ejected by the force of the fail, and remain generally in place, preventing a disconnected flowline segments from becoming lethal projectile. The method and system are not limited to the use of only a half hitch knot.

Figure 6:
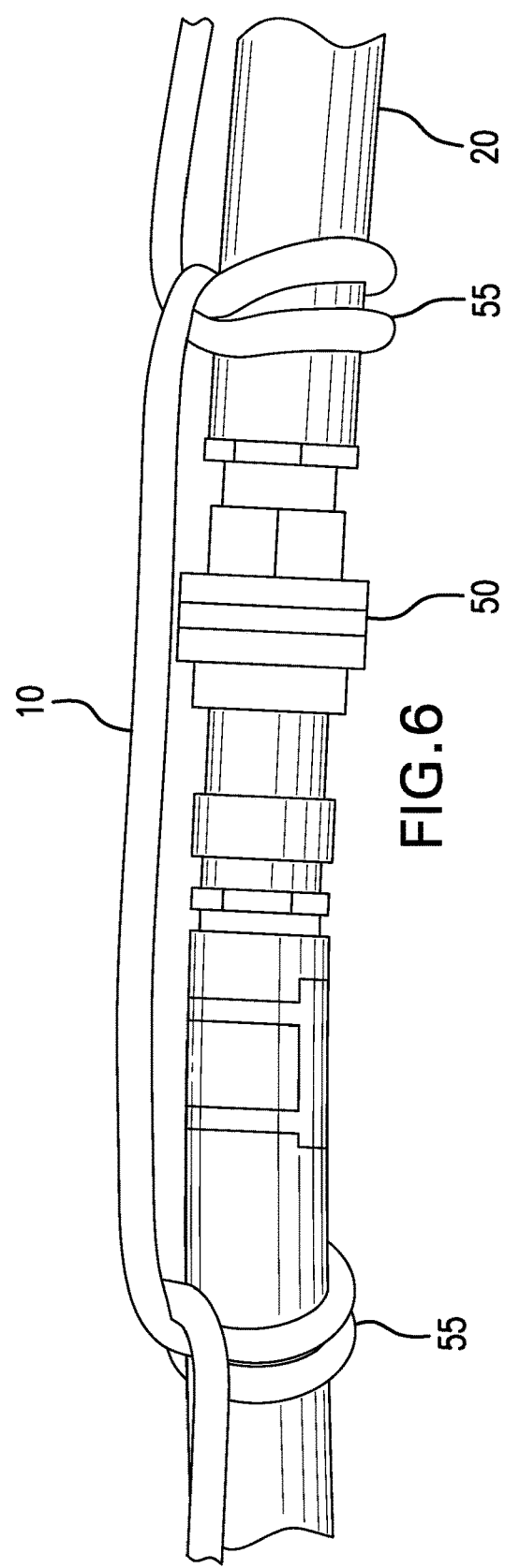
FIG. 6 depicts an embodiment of a flowlines restraint system in which a double wrap half hitch knot on either side of a flowline joint is used to secure the flowline.

Those of skill in the art will appreciate that others forms of knot may also be used to secure a restraining line around the circumference of a flowline to provide additional security at joints or junction in the event of a failure of said joint or junction. For example, and as depicted in FIG. 6, a user make fashion a double wrap half hitch 55 around the circumference of a flowline on either side of a joint in the line. Similarly, and as depicted in FIG. 7, one may use a combination of shackles and knots place on either side of a joint in a flowline to secure the line.

Figure 5A:
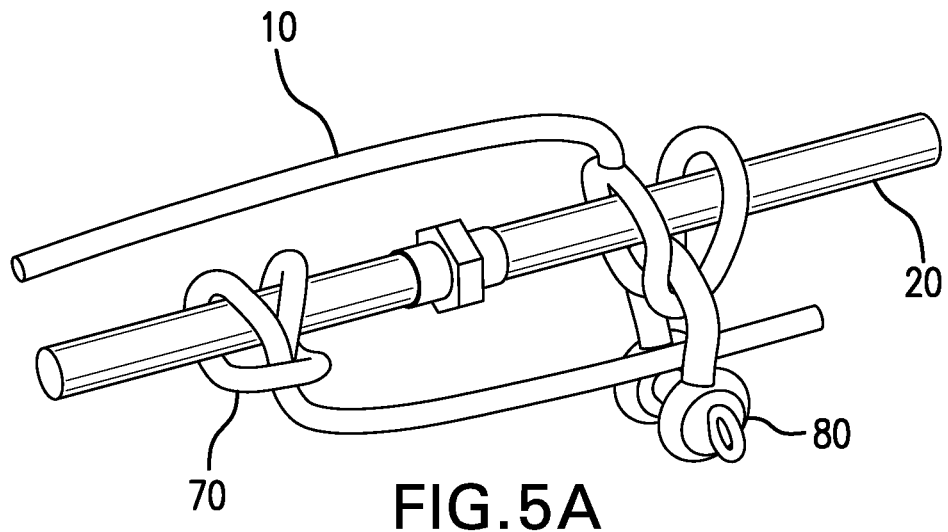
FIGS. 5A, 5B and 5C depicts embodiments of a flowline restraint system further comprising shackles and saddle eyes for use in connecting multiple restraining lines into a longer chain.
Figure 5B:
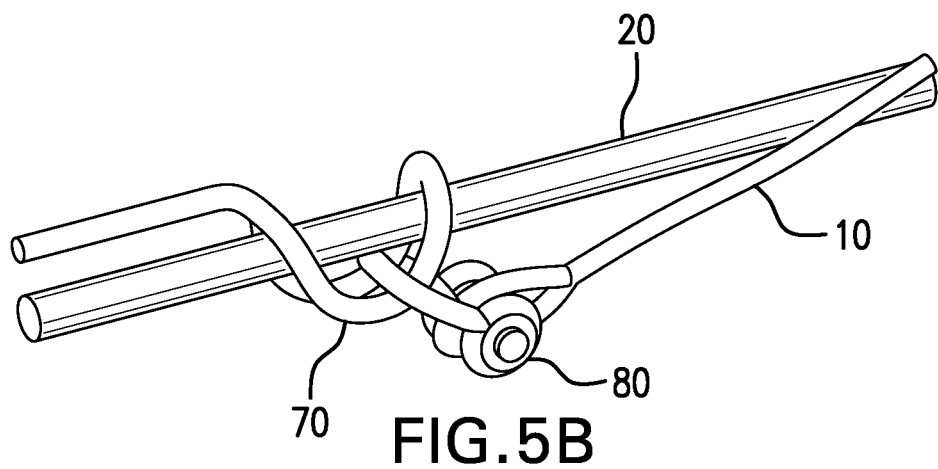
Figure 5C:
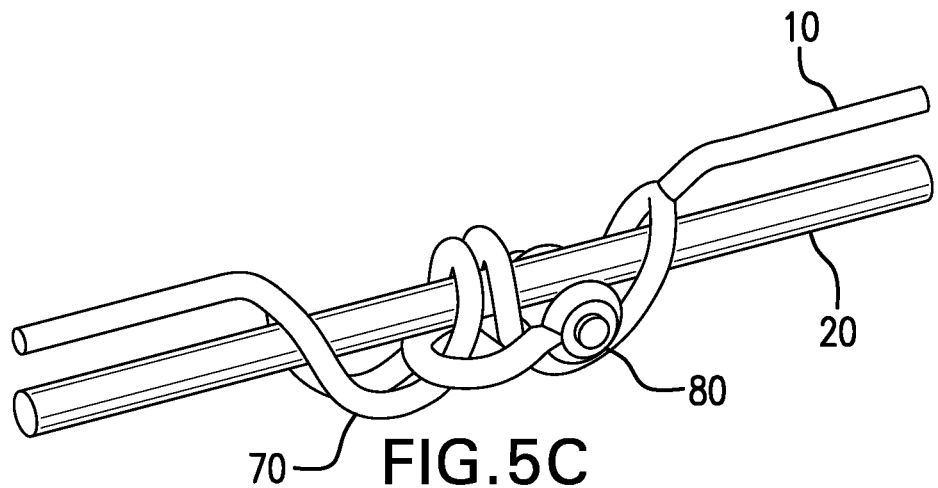

The method is also adaptable to other methods and apparatus for securing a flowline segment with a restraint restraining line as described. As depicted in FIG. 5, a restraint restraining line having a looped end can be secured to a flowline segment by a saddle knot 70. In way overlapping restraints can be used to secured adjacent flowline segments. Similarly, several restraint lines can be connected to each other to form longer restraint structures using saddle knots, shackles 80 or a combination of the two, again as depicted in FIG. 5. Such methods of attachment are useful when connecting several individual restraint lines together to make a longer chain. For example, in some cases the length of the flowline may be relatively long, making providing a single contiguous restraint restraining line impractical. In these cases, restraints can be assembled in a modular fashion and additional restraints added to the chain as needed to secure the entire length of the flowline.

It will be appreciated that the system and methods described can be used with a wide range of different types and sizes of flowlines. The selection of materials from which to fashion restraining lines, as well as the caliber of such lines will be dependent on the expected forces that may be exerted upon a restraining line in the event of a flowline failure. Such factors are considered to lie within the scope of the claims as set forth.

The invention claimed is:

1. A method of restraining at least a portion of a flowline having two ends and comprising a plurality of flowline segments connected in an end to end manner with a flowline joint between each adjacent pair of flowline segments, wherein the method comprises:
   a. coupling a restraining line to a first anchor located in proximity to an end of the flowline, said restraining line being a non-sling restraining line;
   b. extending the restraining line from the first anchor along the portion of the flowline and knotting the restraining line around the circumference of each flowline segment on each side of each flowline joint within said portion; and
   c. securing the restraining line to a second anchor at the distal end of the portion from the first anchor, thereby providing a restrained portion of the flowline from the first anchor to the second anchor;

whereby upon a failure of a flowline joint within the restrained portion of the flowline, the restraining line knotted around the circumference of the flowline segments on either side of the failed joint will hold said flowline segments in position in relation to the remainder of the flowline.

2. The method of claim 1 wherein the restraining line is knotted around each flowline segment in a half hitch knot.

3. The method of claim 1, wherein the first anchor is located at a source end of the flowline.

4. The method of claim 1, wherein the first anchor is located at an output end of the flowline.

5. The method of claim 1, wherein the restraining line is a single restraining line is used to secure the entirety of the restrained portion of the flowline.

6. The method of claim 1, wherein the restraining line comprises a plurality of restraining lines that are used to secure the entire length of the restrained portion of the flowline.

7. The method of claim 6, wherein each of the plurality of restraining lines are secured to at least one other restraining line by at least one of a saddle knot and a shackle.

8. The method of claim 1 wherein the restrained portion of the flowline is the entire length of the flowline.

9. The method of claim 1 wherein the restrained portion of the flowline is less than the entire length of the flowline.

10. The method of claim 1 wherein the restraining line is a high tensile strength rope.

11. A restraint system for use in restraining at least a portion of a flowline having two ends and comprising a plurality of flowline segments connected in an end to end manner with a flowline joint between each adjacent pair of flowline segments, said system comprising:
   a. a restraining line for attachment between a first anchor and a second anchor, said first anchor being located in proximity to a first end of the portion of the flowline to be restrained, and said second anchor located in proximity to a second end of the portion of the flowline to be restrained, said restraining line being a non-sling restraining line, wherein:
      i. during use the restraining line is extended along the length of the restrained portion of the flowline and is knotted around the circumference of each flowline segment on each side of each flowline joint within said restrained portion; and
      ii. the restraining line is of sufficient tensile strength to maintain the flowline segments on either side of a failed flowline joint in position upon failure of said joint.

12. The restraint system of claim 11 wherein the restraining line is a rope.

13. The system of claim 11, wherein the restraining line is a single restraining line is used to secure the entirety of the restrained portion of the flowline.

14. The system of claim 11, wherein the restraining line comprises a plurality of restraining lines that are used to secure the entire length of the restrained portion of the flowline.

* * * * *